United States Patent [19]

Witty

[11] Patent Number: 5,031,122
[45] Date of Patent: Jul. 9, 1991

[54] PROCESS AND APPARATUS FOR ADDING TITLES, SUBTITLES, AND COMPUTER-GENERATED IMAGES TO PRE-EXISTING PHOTOGRAPHIC IMAGES

[76] Inventor: Craig D. Witty, 654 Ash St., Winnetka, Ill. 60093

[21] Appl. No.: 622,324

[22] Filed: Nov. 28, 1990

Related U.S. Application Data

[63] Continuation of Ser. No. 204,874, Jun. 10, 1988, abandoned.

[51] Int. Cl.$^5$ .................... G06F 15/20; G03B 21/32
[52] U.S. Cl. ............................ 364/525; 355/39; 352/90
[58] Field of Search .................. 364/525, 524, 514; 350/330, 266; 352/90, 97, 200; 353/21; 355/3 R, 39, 4, 32

[56] References Cited

U.S. PATENT DOCUMENTS

| | | | |
|---|---|---|---|
| 2,727,427 | 12/1955 | Jenkins | 88/16 |
| 3,815,980 | 6/1974 | Roth | 352/90 |
| 4,076,414 | 2/1978 | Tulbert | 355/38 |
| 4,229,095 | 10/1980 | Mir et al. | 355/4 |
| 4,375,649 | 3/1983 | Mir et al. | 355/32 |
| 4,386,836 | 6/1983 | Aoki et al. | 355/3 R |
| 4,563,059 | 1/1986 | Clark et al. | 350/330 |
| 4,720,804 | 1/1988 | Moore | 364/525 |

OTHER PUBLICATIONS

Optical Engineering Magazine, Jul./Aug. 1978, pp. 317-326.

Primary Examiner—Parshotam S. Lall
Assistant Examiner—V. Trans
Attorney, Agent, or Firm—Rockey and Rifkin

[57] ABSTRACT

A method and apparatus for adding titles, subtitles, and computer-generated images to pre-existing film images as part of the process of rephotography or photographic printing, in which a light valve is used first to create a high-contrast mask to prevent double exposure, and the same light valve is subsequently used to expose the image of the titles, subtitles, or computer-generated graphics onto the film.

10 Claims, 2 Drawing Sheets

PROCESS AND APPARATUS FOR ADDING TITLES, SUBTITLES, AND COMPUTER-GENERATED IMAGES TO PRE-EXISTING PHOTOGRAPHIC IMAGES

This invention relates to the production of titles, subtitles, and graphics for motion picture films, and more particularly to an improved method and apparatus for generating such titles and graphics directly onto a duplicate film without the need for making intermediate film title rolls, as is the current practice.

Almost all motion picture films released to the public have titles. These titles typically include the name of the film and a list of the people who were involved in its production. Also, a large number of motion pictures are produced which include subtitles (when the dialogue or narration is in a foreign language) or "open captions" (for the hearing impaired). And, increasingly, computer-generated graphics are used as visual elements in the motion picture production process.

Film titles occasionally appear against a black background, but it is a more common practice to display the titles against a background of previously filmed action. It is almost invariably the case with subtitles that the transcribed dialogue or narration appears over a live action film scene. The need therefore arises to employ techniques which combine titles and other graphic elements with pre-existing cinematographic images onto a single piece of film. The current practice is to generate the title and graphic elements on a separate roll of photographic film. These title images are then combined with the pre-existing film images during a multiple-exposure optical or contact printing process.

Using the case of film subtitles as an example, the creation of a title roll involves, first, transcribing (and for a foreign-language film, translating) the dialogue or narration scene by scene, while at the same time maintaining a count of the individual frames at which each selection of dialogue or narration begins and ends. Next, the transcribed dialogue or narration is typeset, with black type on white cards, each typically containing no more than three lines of forty characters per line. (It can be seen that a typical feature length film will require making hundreds of these title cards.) From these title cards a high-contrast sheet film negative is made, one sheet per card. On these hi-con negatives the type now appears as clear letters surrounded by a black background. At this stage it is common to repair any scratches or pin holes that appear in the black background by hand, using opaque black paint to cover the imperfections. Next, the high-contrast film sheets are placed one at a time and in sequence on an animation camera stand. They are lit from the back with white light and rephotographed onto a film title roll, maintaining frame for frame correspondence with the location of the dialogue or narration in the original film. This title roll is then combined with the original film onto a duplicate negative through optical or contact printing. This is often done without the use of mattes (photographic masks) to prevent a double exposure in the area of the titles. The white light used to expose the titles is simply "burned in", completely overexposing the latent photographic image on the film in the area of the titles. When mattes are used, the results tend to be of a higher quality. But the production of these mattes entails several additional laboratory printing stages and therefore significantly adds to the expense of the titling operation.

As those skilled in the art will appreciate, this is a complicated, labor intensive process, and faulty work at any stage of operation degrades the quality of the resulting titles.

Consequently, there have been efforts made to streamline the number of steps involved, especially in the area of automating operations that are commonly done by hand.

The current state of the art may be defined by U.S. Pat. No. 4,666,271 which describes a system which uses a computer to compose the film titles, and a "screen copier" or high resolution cathode ray tube based film recorder, such as the ones made by Dunn and Matrix, to record a negative image of the titles (i.e., black type on a clear background) onto a roll of black and white film. Once processed, the images on this roll of black and white film "permit obtaining, by superposition, a color copy C2 with reserved spaces for the subtitles". In other words, the black and white film is used as a matte to mark the areas on the screen to be occupied by the titles. The unprocessed color copy C2 (typically a master positive or duplicate negative) is then run through the CRT-based film recorder and white or colored type which matches the masked title areas is imaged onto the film.

This system has the advantage, compared with previous systems, of automating the composition of titles through the use of a computer. It also employs the use of mattes to allow for title colors other than white. But it suffers from several remaining disadvantages.

One disadvantage is that it depends on the generation of a high-contrast black and white film title roll for its operation. Such a dependence involves not only exposing and processing this role of film, but also manipulating it during the printing of a master positive or duplicate negative in a contact or optical printing process.

A second disadvantage is that using a CRT-based film recorder to expose title information onto a master positive or duplicate negative results in very long exposure times. This is due to the fact that the amount of light that is available from a cathode ray tube is quite low compared to the light available from an incandescent light source, and because the light sensitivity of duplicating films is very low, on the order of ASA 5. Long per-frame exposure times, multiplied by the thousands of frames in a typical film, results in a very time-consuming film printing operation.

It is accordingly an object of the present invention to provide a film graphics and titling process and apparatus therefor which overcomes the foregoing disadvantages.

It is a more specific object of the present invention to provide a process and apparatus therefor which can be used to create titles and graphics for cinematography without having to separately prepare film title rolls.

It is yet another object of the invention to provide a process and apparatus for the creation of titles and graphics in which the images and their complimentary mattes are prepared instantaneously by electronic means, and exposed onto film by means of a high intensity light source.

It is a related object of the invention to provide a process and apparatus therefor in which the contrast of a title or graphic image, and the contrast of its complimentary matte, can be more precisely controlled in real time during the printing process.

These and other objects of the invention will appear more fully hereinafter, and, for the purposes of illustration, but not of limitation, embodiments of the present invention are shown in the accompanying drawings wherein.

The concepts of the present invention reside in apparatus and a process for use in cinematography wherein any alphanumeric characters, graphic symbols, or other computer-generated images, as well as their complimentary mattes, are created electronically and then used, where desired, consequently in the rephotography of the scene, as in the creation of titles and subtitles. In accordance with the invention, use is made of a light valve to selectively modulate light received by, for example, a photographic camera.

The concepts of the present invention can also be used to control the contrast of the complimentary mattes which are used in the process of superposing titles and graphics over pre-existing film images.

The apparatus and method of the present invention find application in creating titles and subtitles for motion picture films. To use the process of creating subtitles as an illustrative case, the dialogue or narration from the original film is translated and/or transcribed, scene by scene, while at the same time maintaining a count of the photographic frames at which each selection of dialogue or narration begins and ends. The transcription may be done first on paper and then entered into a computer memory file manually by means of a keyboard. It may also be transferred from paper to a computer memory file by means of optical character recognition equipment and software. It may also be dictated to the computer memory file using speech recognition equipment and software. The transcription may also be done directly into computer memory by means of a keyboard and a text editing program, completely eliminating the step in which a transcription exists on paper. Information regarding the frame number at which each selection of dialogue or narration begins and ends is also entered into the computer memory file.

In the case of this and other types of titles, a graphic digitizing tablet or similar device may also be used to enter graphical characters or images into the computer memory file.

Figure 1:
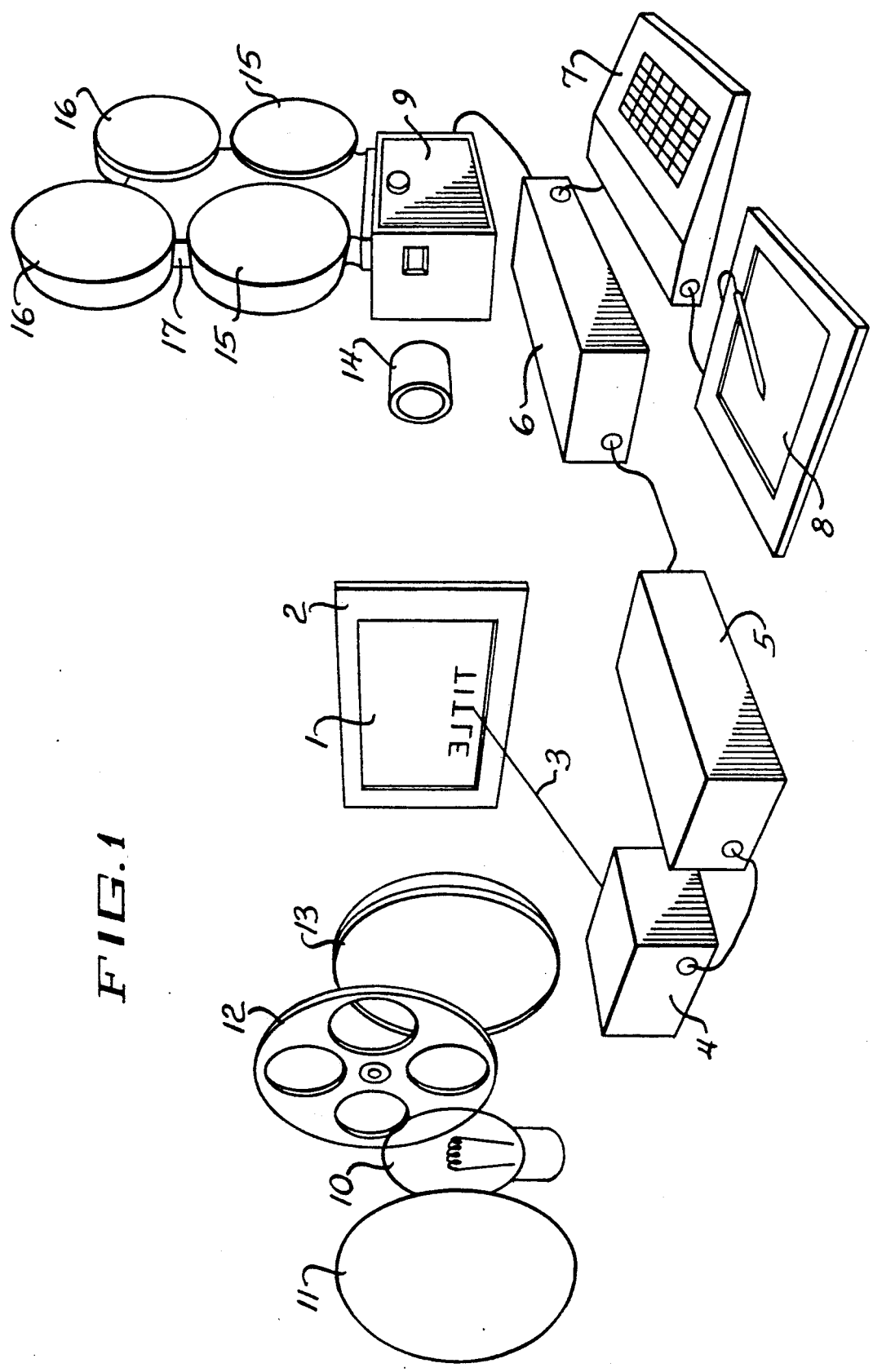
FIG. 1 is a schematic view illustrating the process and apparatus of the present invention.

Referring now to FIG. 1 for a detailed description of an illustrative embodiment of the present invention, there is shown a photographic recording device 9, such as a conventional motion picture camera designed for use in motion picture rephotography and printing. Unexposed film such as Eastman Color Intermediate II Film is loaded into film chambers 16 of bi-pack film magazine 17 and threaded through the camera gate with the film emulsion facing outward, away from the interior of the camera. The original film to be subtitled, or preferably, a timed and color-corrected master positive print of the original film, is loaded into film chambers 15 of the bi-pack magazine 17 and threaded through the camera gate with the film emulsion facing inward, toward the interior of the camera, and in immediate contact with the emulsion of the unexposed roll of duplicating film.

Any light allowed to pass through the shutter of the camera 9, as for example from an assembly consisting of a high intensity light source 10, a reflector 11, a selective color filtration device 12, and a condensing lens assembly 13, will consequently print the image of the master positive film onto the unexposed duplicating film with which it is in contact. If white light is allowed to fall across the entire area of the film frame the original image will be printed as a duplicate (positive or negative, depending on the type of film used) without alteration.

If, however, light is prevented from falling across the entire area of the film frame, the areas from which it is excluded will remain unexposed. As shown in FIG. 1, lens 14 focuses the image of light valve 1, supported by frame 2, onto the film in camera 9. In the preferred embodiment, the light valve 1 is a smectic liquid crystal light valve such as that marketed by Greyhawk Systems and described in ESD magazine (January 1988, pp. 47-50). In an alternate version of this embodiment the light valve is a disk of PLZT (lead lanthanum zirconate titanate) ceramic which is photoferroelectrically sensitive to the electromagnetic radiation 3 directed at the light valve by the laser beam scan unit 4 as described in Optical Engineering magazine (July/August 1978, pp. 317-326). In yet another version of this embodiment, the light valve is an electronically addressable liquid crystal display such as the Datashow marketed by Eastman Kodak, the Viewframe marketed by N-View, or the Flat-Top marketed by Network Specialties, or other high-contrast, high-resolution liquid crystal display. (In the case of these last mentioned electronically addressed liquid crystal displays, the laser scan unit 4 is not necessary for the operation of the system.)

Transcribed text and/or graphics stored in computer 6, having been previously entered and stored in a computer memory file through keyboard 7, graphics tablet 8 or a similar device, through optical character recognition hardware and software not shown, or through speech recognition hardware and software not shown, is sent to graphic processor 5, and subsequently to a laser beam scan unit 4. The electromagnetic radiation 3 emitted from the laser beam scan unit 4 is directed to the liquid crystal light valve 1 only in those areas to be occupied by text or graphics. The molecules of liquid crystal in these areas, under the stimulus of the electromagnetic radiation, change orientation and scatter the light passing through the light valve from the light source 10. In as much as the image of the light valve is focused by lens 14 onto the film in the camera 9, the light scattered from the text- and graphics-containing areas of the light valve does not reach the film and these areas of the film remain unexposed. Thus, the laser traces on the liquid crystal light valve 1 a matte, or negative mask, corresponding to the text or graphic information that is to be superposed on the duplicate film.

By controlling the total amount of laser radiation 3 that is directed to any given area of the light valve, the degree to which light is scattered by this area can be controlled and therefore the contrast between the affected and unaffected areas of the light valve can be controlled. In such a light scattering system, contrast is also controlled by the aperture (F-stop) of the imaging lens 14. Thus, in accordance with this embodiment of the invention, there are two independent means for controlling the contrast of an image created on the light valve 1.

Light passing through the unaffected areas of the light valve is focused by the lens 14 and prints the image of the original film onto the duplicate film.

Each frame of the original film is printed in similar fashion. For sections of the film that contain dialogue or narration a matte is generated on the light valve which corresponds to the text or graphics to be superposed over that particular scene, and the corresponding areas on each frame of duplicating film remain unexposed.

At such time as the last frame of film has been printed, with mattes corresponding to the text or graphic information to be superposed on the images printed from the original film or master positive, the original or master positive film is removed from the camera 9. With latent images of the original scenes, and areas of unexposed film corresponding to the text and graphic information now on the duplicate film in the camera 9, this film is rewound, with the shutter closed, to the first frame in the film which contains dialogue or narration. At this time the computer 6 calls up information from the memory file regarding the text or graphic information which corresponds to the dialogue or narration that accompanies this frame, and sends an appropriate electronic signal to the graphics processor 5, and subsequently to the laser beam scan unit 4. The electromagnetic radiation 3 from the laser beam scan unit is directed to all the areas of the liquid crystal light valve which were unaffected during the first exposure of this frame of film, thus creating a positive image or complimentary matte of the text and graphic information contained on this frame of film. This test and graphic information thus appears clear on the light valve while the surrounding areas scatter the light which passes through the light valve from the light source 10. White light, or colored light which is created by passing white light through the selective color filtration device 12, is thus imaged onto the duplicate film by lens 14 when the shutter of the film camera 9 is opened. This light falls onto the film in exact registration with the unexposed areas of the latent image created during the first exposure of this frame. The light exposes these areas and creates a latent photographic image of the text and graphic information superposed on the pre-existing original film image.

Each frame of the film is printed in a similar way. Frames of the film which do not contain dialogue or narration are left unexposed, or only exposed to an image of the light valve in which the entire surface of the light valve is in the light scattering mode. Frames which contain text or graphic information are exposed to images of the light valve on which this information is displayed as clear areas surrounded by light scattering areas.

At such time as the printing operation is completed and the duplicate film is processed and developed, the text and graphic information which corresponds to the dialogue or narration on each frame will appear superposed on the images of the pre-existing original film.

Thus it is apparent that the process and apparatus of the current invention allows for the superposition of titles, subtitles, and any other computer-generated graphic elements without the necessity of creating a separate black and white film title roll, that the process and apparatus of the invention allows for the use of mattes to achieve a high quality of results, and that the process and apparatus of the invention allows the contrast of these mattes to be controlled in order to further insure the quality of the results. It is also apparent that, because superposition of text and graphic information is done as part of the film printing process and does not require the preparation of a separate film title roll and a separate film printing operation, and because a high-intensity light source 10 can be used to expose images onto the duplicate film, the present invention allows for the superposition of titles, subtitles, and other computer-generated graphic elements in a much shorter period of time than is possible using a cathode ray tube as a light source.

Figure 2:
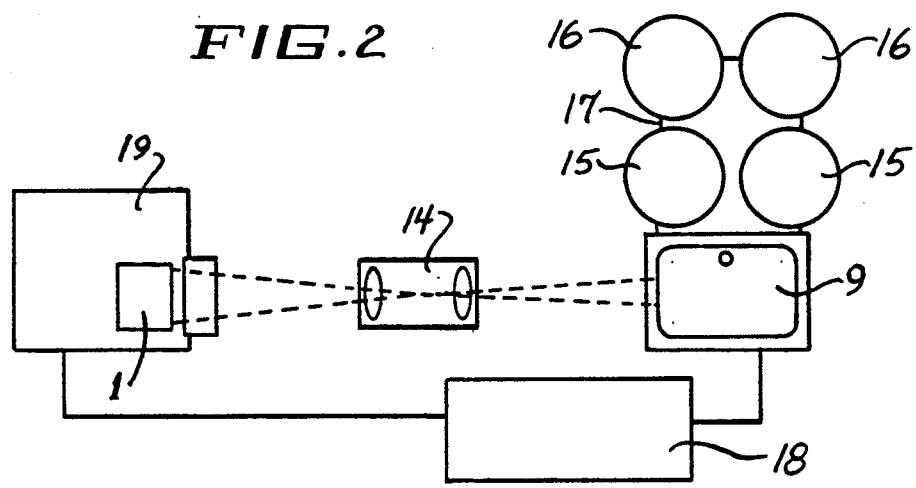
FIG. 2 is a diagrammatic view illustrating the process and apparatus of the present invention configured to be used in a contact printing process.

FIG. 2 is a diagrammatic view illustrating the process and apparatus of the invention as described above in which the computer 6, the input devices 7 and 8, and the graphics processor 9 are represented by the apparatus 18, and the laser beam scan unit 4, the reflector 11, the light source 10, the selective color filtration device 12, and the condenser lens assembly 13 are contained in a lamp housing 19. FIG. 2 illustrates the process and apparatus for superposing titles, subtitles, and computer-generated graphics during a contact printing operation, as described briefly above.

Figure 3:
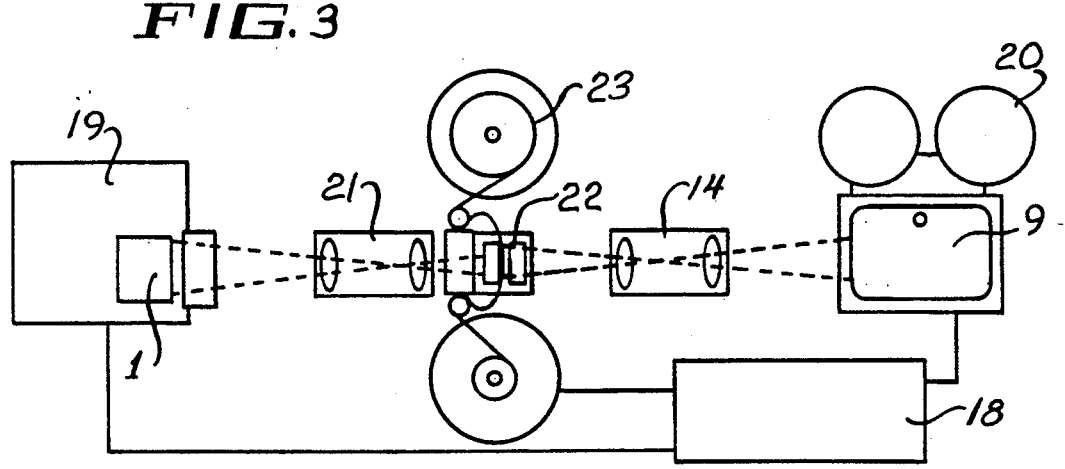
FIG. 3 is a diagrammatic view illustrating the process and apparatus of the present invention configured to be used in an optical printing process.

FIG. 3 is a diagrammatic view illustrating the process and apparatus as it could be applied to an optical printing operation. In this embodiment the unexposed duplicating film is loaded into film magazine 20 on camera 9. The original or master positive film 23 is loaded into an optical printer projector head 22. The image of the liquid crystal light valve 1 in lamp housing 19 is projected as an aerial image by lens 21 onto the film 23 in the gate of the optical printer projector head 22. The combined image of the light valve 1 and the original or master positive film 23 is then refocused by lens 14 onto the film in camera 9. The sequence of operations used to superpose titles and other graphic elements onto the film in camera 9 is the same as the sequence described above for a contact printing operation. The difference between an optical printing embodiment of the invention and a contact printing embodiment of the invention is that in optical printing the image of the original or master positive film would be optically imaged onto the duplicate film rather than being printed through physical contact with the duplicate film.

Figure 4:
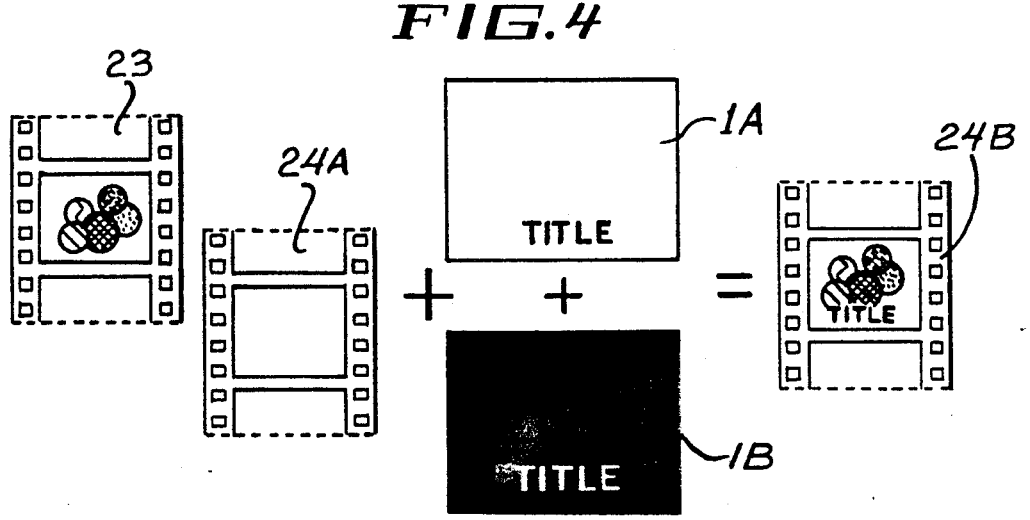
FIG. 4 is a representative illustration displaying the combination of film elements and light valve images which will result in the superposition of titles or graphics on the pre-existing film scene.

FIG. 4 is a representative illustration showing the printing of images from the original or master positive film 23 onto unexposed duplicate film 24A, in conjunction with a matte of the title or graphic information displayed on light value 1A, followed by anexposure of the title or graphic information displayed on light valve 1B, resulting in title or graphic information superposed and visible on the processed and develop duplicate film 24B, whether the printing is done by means of a contact or optical printing operation.

It will be understood that various changes and modifications can be made in the details of apparatus and use without departing from the spirit of the invention, especially as defined in the following claims.

I claim:

1. A system for adding computer-generated images to pre-existing motion picture film images comprising:
   (a) photographic recording means for recording said computer-generated images;
   light valve means for selectively allowing or preventing light to fall on film in said photographic recording means, whereby light is prevented from falling onto said film in areas corresponding to said computer-generated images;
(c) means for generating said computer-generated images on said light valve means; and,
(d) control means for controlling said means for generating said computer-generated images on said light valve means.

2. A system as defined in claim 1 wherein the photographic recording means includes a photographic camera.

3. A system as defined in claim 1 wherein the light valve means includes a laser addressed smectic liquid crystal light valve.

4. A system as defined in claim 1 wherein the light valve means includes a laser addressed plate of PLZT (lead lanthanum zirconate titanate) ceramic.

5. A system as defined in claim 1 wherein the light valve means includes an electronically addressed liquid crystal display.

6. A method for adding computer-generated images to pre-existing motion picture film images comprising the steps of:
(a) generating on a light valve means a negative image of said computer-generated images to be superposed on the pre-existing photographic film images;
(b) photographing a first image with photographic recording means of the pre-existing film images using the light valve means containing the negative image of said computer-generated images as a light source focused on film in the photographic recording means, whereby the negative image is effectively subtracted from the pre-existing film image; and,
(c) photographing on the same film a successive image with said photographic recording means using the light valve means containing a positive image of said computer-generated graphics as a light source focused on the film in the recording means.

7. A system as defined in claim 6 wherein the photographic recording means is a photographic camera.

8. A system as defined in claim 6 wherein the light valve means includes a smectic liquid crystal light valve.

9. A system as defined in claim 6 wherein the light valve means includes a plate of PLZT ceramic.

10. A system as defined in claim 6 wherein the light valve means includes an electronically addressed liquid crystal display.

* * * * *